United States Patent [19]
Mitchell et al.

[11] Patent Number: 5,901,584
[45] Date of Patent: May 11, 1999

[54] METHOD AND APPARATUS FOR COOKING AND DISPENSING STARCH

[76] Inventors: Wesley W. Mitchell, Mesquite; Wilson W. Mitchell, Rowlett, both of Tex.

[21] Appl. No.: 08/906,327

[22] Filed: Aug. 5, 1997

Related U.S. Application Data

[63] Continuation-in-part of application No. 08/496,369, Jun. 29, 1995, Pat. No. 5,680,663, which is a continuation-in-part of application No. 08/192,559, Feb. 7, 1994, Pat. No. 5,437,169.

[51] Int. Cl.[6] .................................................. D06F 39/02
[52] U.S. Cl. ........................ 68/17 R; 68/207; 127/28
[58] Field of Search .................................. 68/17 R, 207; 134/93; 137/268; 127/28

[56] References Cited

U.S. PATENT DOCUMENTS

| | | | |
|---|---|---|---|
| 881,105 | 3/1908 | Breyer | 127/28 |
| 2,805,966 | 9/1957 | Etheridge | 127/28 |
| 2,871,146 | 1/1959 | Etheridge | 127/28 |
| 2,919,214 | 12/1959 | Etheridge | 127/28 |
| 3,133,836 | 5/1964 | Winfrey et al. | 127/28 |
| 3,489,162 | 1/1970 | Meynell | 137/100 |
| 4,280,851 | 7/1981 | Pitchon et al. | 127/28 |

*Primary Examiner*—Frankie L. Stinson
*Attorney, Agent, or Firm*—Carla J. Dolce

[57] ABSTRACT

A commercial starch cooking and dispensing apparatus comprises means for preparing a starch suspension of uncooked starch in water and discharge means for discharging the starch suspension to a starch cooking valve for cooking the uncooked starch suspension to form a starch solution which is dispensed to one or more commercial laundry machines. A method of cooking laundry starch utilizes a starch cooking valve that dispenses cooked starch as it is cooked to one or more commercial laundry machines.

19 Claims, 3 Drawing Sheets

5,901,584

METHOD AND APPARATUS FOR COOKING AND DISPENSING STARCH

RELATED APPLICATION

This is a continuation in part of application Ser. No. 08/496,369, filed Jun. 29, 1995 now U.S. Pat. No. 5,680,663, issued, Oct. 28, 1997 which was a continuation in part of application Ser. No. 08/192,559, filed Feb. 7, 1994, now U.S. Pat. No. 5,437,169, issued Aug. 1, 1995.

BACKGROUND OF THE INVENTION

1. Field of the Invention

The present invention relates to a method and apparatus for cooking laundry starch. More particularly, the invention relates to an apparatus and method for the cooking and dispensing of single batches of laundry starch which are cooked and discharged in consecutive single batches as needed to one or more commercial laundry machines.

2. Description of Related Art

In most modern commercial laundries, starch is added to the commercial laundry machines either by adding a pre-cooked dry starch or a liquid synthetic starch directly to the machines as needed. Both precooked and synthetic starch are significantly more expensive than uncooked starch, which is sometimes referred to as "pearl starch." Additionally, precooked starch frequently does not dissolve completely leaving starch specks on the garments as well as causing starch build-up on the press heads when the garments are pressed. To avoid the expense of precooked starch some commercial laundries add uncooked starch directly to the laundry machines. The uncooked starch is later cooked when the garment is pressed. Although this method reduces starch costs, it causes starch buildup on the press heads and results in uneven starching of the garments.

To reduce the costs of using precooked dry starch or synthetic starch and to avoid the problems with using uncooked starch, some commercial laundries use existing starch cookers in which a large vat of starch solution is cooked and then drawn from the vat manually. Some examples of existing starch cookers can be seen in U.S. Pat. No. 2,253,262 to Bierly, U.S. Pat. No. 1,418,320 to Miller, or U.S. Pat. No. 1,190,690 to Tyler.

The problems of existing starch cookers include insufficient agitation resulting in lumpy starch, inferior starching and starch build-up on press heads; overcooking the starch resulting in inferior starching of the garments; fouling of unused starch and employee dangers from the manual transfer of hot starch solution from the starch cooker to the laundry machine. These problems were first addressed by the single-batch starch cooking and dispensing apparatus described in application Ser. No. 08/192,559, now U.S. Reg. No. U.S. Pat. No. 5,437,169, and in the improvements and method described in the application to which this application relates, namely, application Ser. No. 08/496,369. Additional refinements and improvements on both the method and apparatus are disclosed herein.

SUMMARY OF THE INVENTION

It is a first object of the present invention to provide a method and apparatus for use in commercial laundries for cooking starch as it is needed and dispensing it to one or more commercial laundry machines in single batch quantities as it is cooked.

It is a second object of the present invention to provide a method and apparatus that includes means for cooking the starch solution that minimizes or eliminates the formation of lumps while being economical to manufacture and operate.

It is a third object of the present invention to provide a starch cooking and dispensing apparatus that is self-cleaning in that it may be rinsed clean after each batch of starch is dispensed to a laundry machine.

It is a fourth object of the present invention to provide a starch cooking and dispensing apparatus that is economical because it allows commercial laundries to use uncooked ("pearl") starch and eliminates or nearly eliminates any waste of starch.

The foregoing objects and other objectives, features and advantages of the invention will be more readily understood from the following brief summary of the invention and the detailed description of preferred embodiments set forth below.

The present invention relates to a commercial starch cooking and dispensing apparatus comprising means for preparing a starch suspension of uncooked starch in water and a discharge means for discharging the starch suspension to a starch cooking valve having a chamber wherein the starch suspension is mixed with steam to cook the starch to form a starch solution. The starch cooking valve is essentially the same as the valve described in U.S. Pat. No. 3,489,162. Preferably, the apparatus has a controlling means for controlling the discharge of starch suspension into and the dispensing of starch solution from the starch cooking valve so that starch solution is dispensed in single batch quantities to one or more commercial laundry machines.

As with the previous embodiments of the invention, the apparatus may be cleaned after each batch of starch is dispensed by permitting clean water to wash through the apparatus as the starch solution is being dispensed to a commercial laundry machine.

The present invention also relates to a method of cooking starch and dispensing the cooked starch in single batches to one or more laundry machines. The method includes the steps of filling a reservoir with water and uncooked starch to form an uncooked starch suspension equivalent to at least one single batch of starch; agitating the starch suspension in the reservoir; discharging the starch suspension from the reservoir to a starch cooking valve having a mixing chamber; cooking the starch suspension to form a starch solution by mixing the starch suspension with steam in the mixing chamber; and dispensing the starch solution from the starch cooking valve as it is cooked in single batch quantities to one or more commercial laundry machines.

DESCRIPTION OF THE PREFERRED EMBODIMENTS

The preferred embodiments of the invention are described with reference to the FIGS. 1, 2, 3, and 4. Like numbers represent like parts in FIGS. 1, 2 and 3. Parts in FIG. 4 are identified by numerals ending in a prime symbol (e.g., 12')

Figure 1:
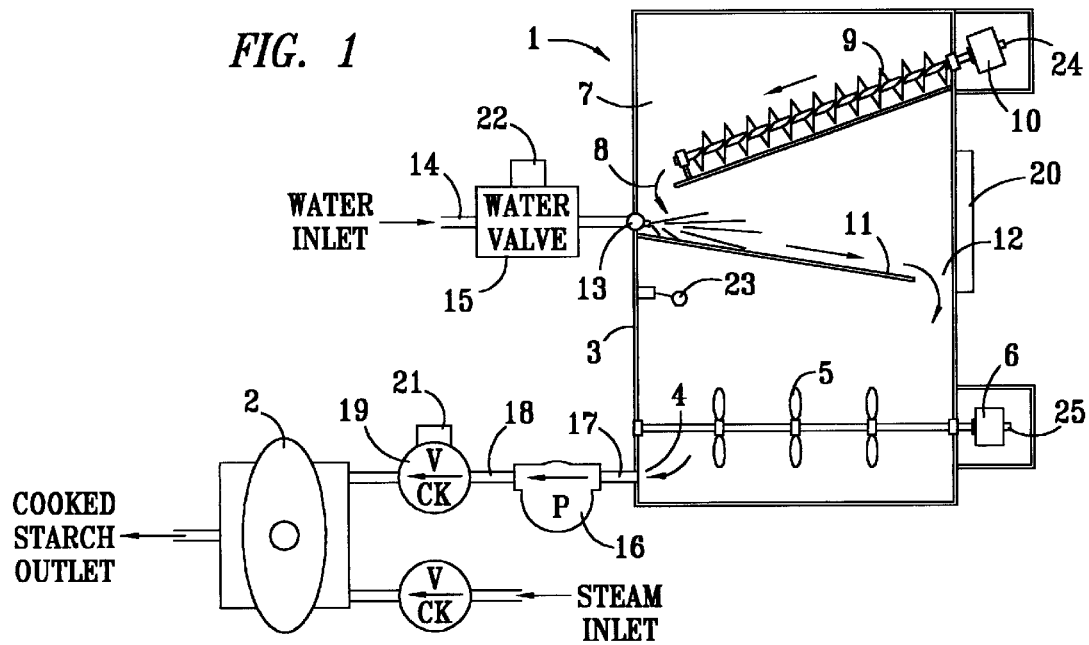
FIG. 1 is a schematic, vertical sectional view of one embodiment of the apparatus.
Figure 2:
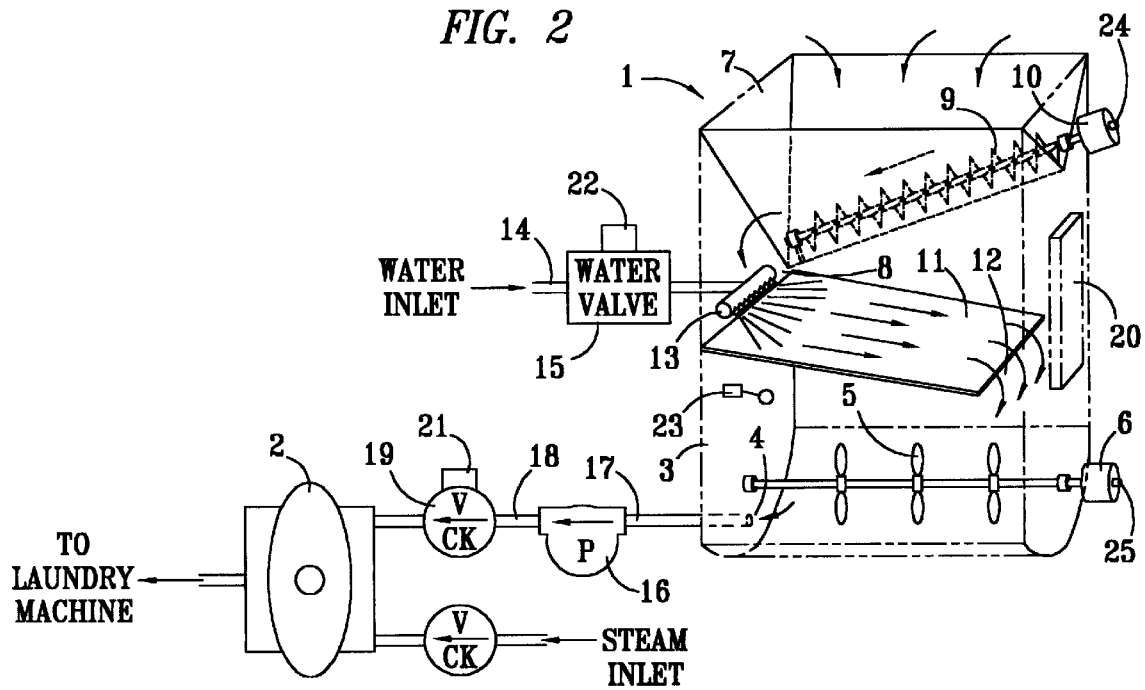
FIG. 2 is a schematic, perspective view of the same embodiment of the apparatus.
Figure 3:
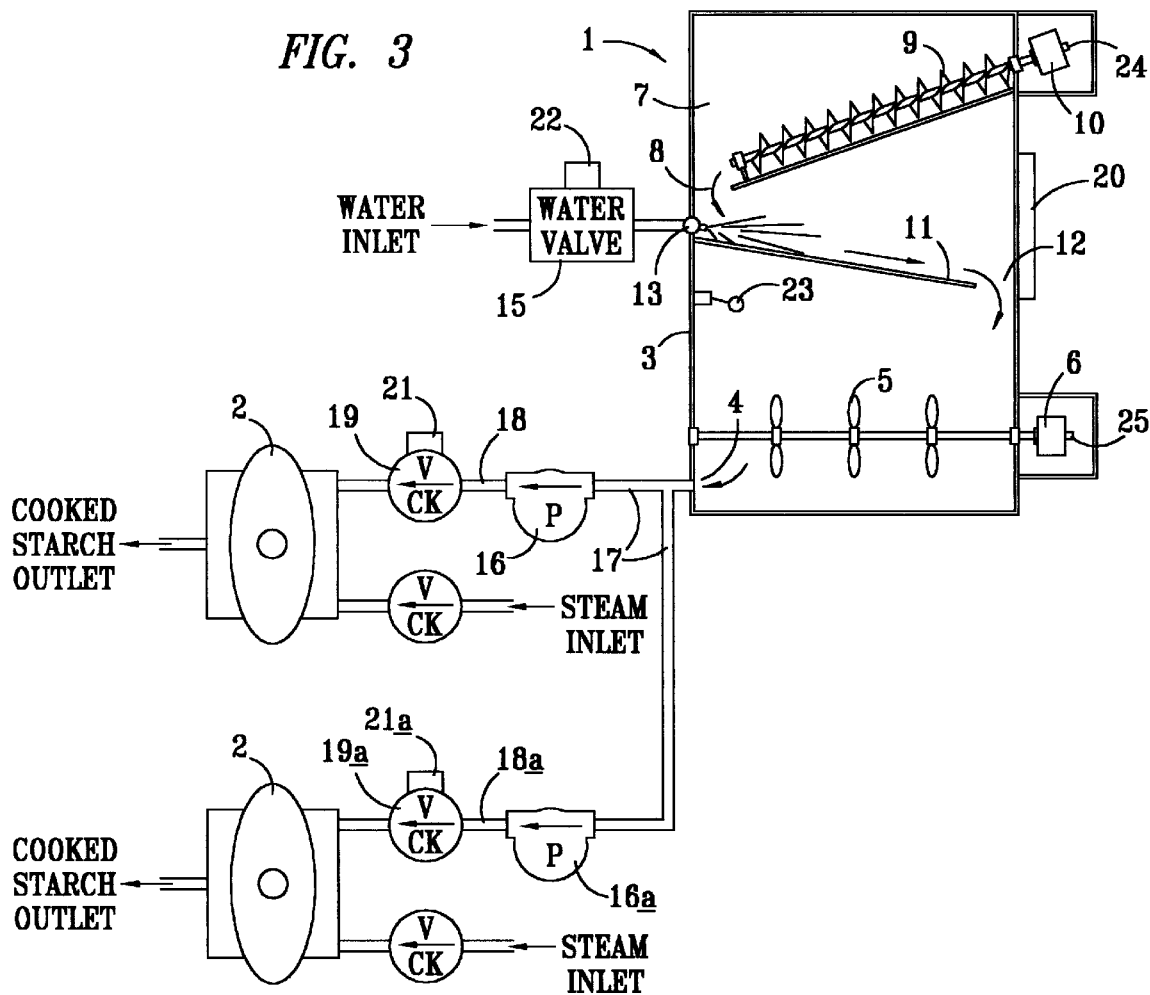
FIG. 3 is a schematic, vertical sectional view of another embodiment of the apparatus.
Figure 4:
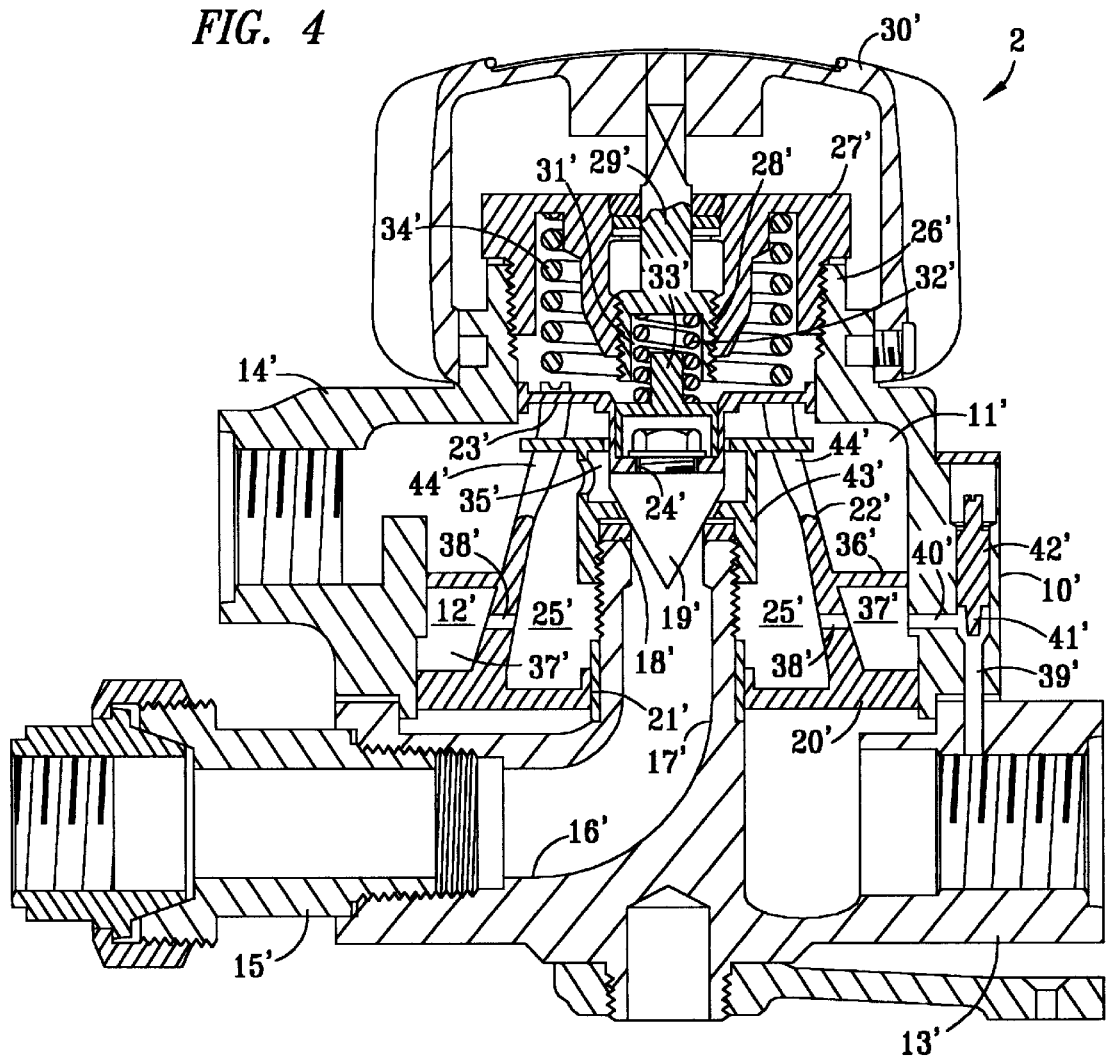
FIG. 4 is a sectional view of the starch cooking valve of the apparatus. (Incorporated herein from U.S. Pat. No. 3,489,162).

As shown in FIGS. 1–3, starch cooking and dispensing apparatus 1 comprises a means for making a suspension of uncooked starch in water, a discharge means for discharging the starch suspension to a starch cooking valve 2, which, as depicted in FIG. 4, has a chamber 25' where the starch suspension is mixed with steam to cook the starch to form a starch solution. As will be described in more detail below, the starch cooking valve 2 is essentially the same as the valve for making hot water described in U.S. Pat. No. 3,489,162. The starch cooking and dispensing apparatus 1 may also comprise controlling means for controlling the means for preparing a starch suspension and for controlling the discharge of starch suspension into, and the dispensing of starch solution from, the starch cooking valve so that starch solution is dispensed in single batch quantities to one or more commercial laundry machines.

As shown in FIGS. 1–3, the means for making the starch suspension comprises a reservoir 3; means for filling the reservoir 3 with water and uncooked starch to form an uncooked starch suspension; and agitation means for agitating the uncooked starch suspension in the reservoir 3. The reservoir 3 has capacity for holding that quantity of uncooked starch suspension needed to make at least one batch of starch solution. The reservoir 3 has a top portion, sidewalls, a bottom portion, and a drain 4 in the bottom portion.

The agitation means preferably comprises at least one mixing blade 5 in the bottom portion of the reservoir 3 powered by a mixing motor 6. Any means may be used for filling the reservoir 3 with water and uncooked starch including the simple mechanical means of adding a premeasured amount of water and uncooked starch to the reservoir. Preferably, the means for filling the reservoir 3 with water and uncooked starch comprises a hopper 7, being juxtaposed above the reservoir 3, and having a hopper outlet 8; a means, such as auger 9 powered by auger motor 10, for moving the dry starch through the hopper outlet 8; a spray down platform 11 between the reservoir 3 and the hopper 7 affixed to the reservoir sidewalls in the top portion of the reservoir 3 so the dry starch falls from the hopper outlet 8 onto the spray down platform 11; a spray means for spraying water onto the spray-down platform 11 to form a starch suspension as the starch falls from the hopper outlet 8 onto the platform 11; and an opening 12 between the spray-down platform 11 and the reservoir 3 for permitting the starch suspension to fall into the reservoir 3.

The spray means may comprise a sprayer conduit 13 extending along at least one sidewall of the spray-down platform 11; a water inlet conduit 14 connected to the sprayer conduit 13 on one end and to a water supply source, not shown in the drawings, on the other end. A water inlet valve 15 is connected to the water inlet conduit 14 selectively opening to permit water to flow through the inlet conduit 14 and through the sprayer conduit 13 and selectively closing to prevent water from flowing into the inlet conduit 14 and through the sprayer conduit 13.

The discharge means for discharging starch suspension from the reservoir 3 and to the starch cooking valve 2 may comprise a pump 16 having a pump inlet and a pump discharge. A pump inlet conduit 17 connects the pump inlet to the drain 4 of the reservoir 3. A discharge conduit 18 connects the pump discharge to the starch suspension inlet 13', shown in FIG. 4, of the starch cooking valve 2. A discharge valve 19 is connected to the discharge conduit 18 selectively opening to permit the starch suspension to flow from the pump 16 to the starch suspension inlet 13', shown in FIG. 4, and selectively closing to prevent the flow of starch suspension from the pump to the starch suspension inlet 13', shown in FIG. 4. Pump discharge valve 19 is a check valve for ensuring that the starch suspension flows only in one direction.

Preferably, the apparatus 1 comprises a controlling means for controlling the preparation of starch suspension and the discharge of starch suspension into the starch cooking valve so that starch solution is dispensed in single batch quantities to one or more commercial laundry machines. The controlling means may comprise an electronic control board 20, including a timing device and a plurality of relays (not shown), associated with the discharge valve 19 for measuring the length of time the discharge valve 19 has been open and for receiving and relaying signals to and from one or more commercial laundry machines.

When the electronic control board 20 receives a signal from a commercial laundry machine indicating that starch is required, that signal is relayed to an electrically energized discharge solenoid 21 which is connected to the discharge valve 19. Discharge solenoid 21 responds to the electronic control board 20 and opens the discharge valve 19. When the electronic control board 20 signals that the discharge valve 19 has been open for a first predetermined period of time, sufficient for discharging a single batch of starch suspension to the starch cooking valve 2, then the control board 20 signals discharge solenoid 21 for closing discharge valve 19. Alternatively, electronic control board 20 may receive a signal from the commercial laundry machine that the machine has received sufficient starch and relay that signal to discharge solenoid 21 for closing the discharge valve 19.

The electronic control board 20 is further associated with the water inlet valve 15 for measuring the length of time the inlet valve 15 has been open and for receiving and relaying signals to and from one or more commercial laundry machines. When electronic control board 20 receives a signal from a commercial laundry machine calling for starch solution, the control board 20 relays that signal to an electrically energized water inlet solenoid 22 connected to the water inlet valve 15 for opening the water inlet valve 15. When the electronic control board 20 signals that the water inlet valve 15 has been open for a second predetermined period of time, sufficient to prepare at least one batch of starch suspension, the electronic control board 20 relays that signal to the water inlet solenoid 22, for closing water inlet valve 15. The second predetermined period of time is preferably calculated to permit the discharge of a single batch of starch solution and the discharge of additional clean water to clean the spray-down platform 11, the reservoir 3, the pump inlet conduit 17, the discharge valve 19, the discharge conduit 18, and the starch cooking valve 2.

The electronic control board 20 may also send and relay signals to an electrically energized auger solenoid 24 which is connected to the auger motor 10. Auger solenoid 24 responds to the electronic control board 20 and activates or deactivates the auger motor 10 depending upon whether or not dry starch is required for making starch solution. The electronic control board 20 may also send and relay signs to a mixing motor solenoid 25 which responds by activating or deactivating mixing motor 6 depending upon whether starch suspension is being prepared.

Apparatus 1 may further comprise float device 23, associated with the reservoir 3, for determining when the reservoir 3 is substantially filled with at least one batch of starch suspension, and further associated with electronic control board 20 for signaling when reservoir 3 is substantially full so the signal can be relayed to water inlet valve 15 for controlling the flow of water into the reservoir 3 from water inlet conduit 14.

As shown in FIG. 4, the starch cooking valve 2 comprises a generally cylindrical body 10', the interior of which forms a cylinder 11' within which a piston 12' is slidably mounted and at one end the body 10' has a radially outwardly extending passage 13' which forms an inlet for the starch suspension, whilst at the opposite end of the body 10' has a radially outwardly extending passage 14' which forms an outlet for the cooked starch solution, such outlet communicating with one or more commercial laundry machines for dispensing cooked starch solution to the laundry machines.

At the end of the body at which the starch suspension inlet is situated there is also provided an inlet connection 15' for a supply of steam and a passage 16' extends radially inwardly from said steam inlet connection to a position at the central axis of the body at which position the passage bends through a right angle and extends inwardly along the axis of the body in the form of a central, coaxially disposed tube 17' which extends axially within the body 10' and at its upper end is provided with a valve seat 18' with which cooperates a valve member 19' for controlling the inlet of steam into the remainder of the body 10'.

The piston 12', mounted within the cylinder 11', has a base portion 20' of circular form machined to be a good sliding fit in the cylinder 11' and the piston 12' is mounted slidably upon the aforesaid tube 17' which extends axially within the body, the base 20' of the piston 12' being apertured, as shown at 21', to accommodate the tube.

The base 20' is arranged so that it is closest to the end of the body 10' at which is positioned the starch suspension inlet 13', the other side of the piston being hereinafter referred to as the "remote side" of the piston, being remote from the starch suspension inlet 13'.

On said remote side the piston 12' has an annular wall 22' which extends towards the end of the body having the cooked starch solution outlet 14' and which is of generally frustro-conical form with the wider diameter end thereof being connected integrally to the base 20' of the piston. At the other end of the annular wall 22' of the piston (hereinafter referred to as the tower 22' of the piston) there is secured a support plate 23' for the valve member 19', said support plate 23' having a central downwardly extending collar 24' to the under side of which is secured the valve member 19' which has operative engagement with the valve seating 18' provided at the end of the seam inlet tube 17' (which is situated within the tower 22' of the piston), the arrangement being that a space which is within the tower 22' and to the outside of said steam inlet tube 17' constitutes a mixing chamber 25' within which the starch suspension and steam mix as hereinafter to be described in more detail.

As the end of the body 10' remote from the starch suspension inlet 13' there is an axially extending collar 26' which is internally threaded and at this end there is provided a cap 27' which screws into the collar 26' and has a central downwardly extending sleeve portion 28' which is internally threaded and which receives in threaded engagement an end of an adjusting spindle 29' which projects outwardly beyond the cap and has secured to its outer end a knob 30' for manual operation for a purpose hereinafter to be described.

The end of the adjusting spindle 29' within the body 10' has a cylindrical recess 31' in which is engaged one end of a small coil compression spring 32', the other end of which spring is engaged against the support plate 23' for the valve member 19' and is located around an upwardly projecting spigot 33' on said support plate 23'. A further, larger, coil compression spring 34' is provided, acting between the under side of said cap 27' screwed into the sleeve 26' and the upper side of the support plate 23' for the valve member 19'. This compression spring 34' provides a constant force tending to urge the valve member 19' into sealing engagement with the seat 18'. The steam pressure at which the valve opens can be adjusted in order to adjust the desired temperature of the mixture by rotation of the aforesaid hand control know 30' which causes increase or decrease in the force exerted by the small compression spring 32' upon the valve member 19', thus providing a fine adjustment over the force urging the valve member 19' into its closed position, the valve member 19' being opened by steam pressure against this closing force as hereinafter to be described.

The upper end of the steam inlet tube 17', within the tower 22' of the piston 12', is externally threaded and has screwed thereon a collar 34' which acts as a retainer for a replaceable valve seating 18' and also extends upwardly so as to surround the valve member 19', the wall of the collar 34' being provided with a number of passages 35' so that as the valve member 19' opens, steam coming from the inlet tube 17' is directed radially outwardly through the passages 35' and directly into the mixing chamber 25' within the tower 22' of the piston 12'.

The tower 22' of the piston 12' is provided with a radially outwardly extending skirt 36' which is spaced away from the base 20' of the piston and which has working engagement with the wall of the cylinder 11' and thus defines an annular space 37' on the outside of the tower 22' of the piston 12' between the skirt 36' and the base 20' of the piston. The lower 22' is provided with at least one but preferably a number of radially extending passages 38' through its wall so as to provide communication between this annular space 37' and the mixing chamber 25' within the tower.

A passage 39' of restricted cross section is provided in the wall of the body 10' of the apparatus and extends in a direction parallel to the general axis of the body from the starch suspension inlet 13' and communicates with a further short passage 40' extending radially inwardly through the body and communicating with said annular space 37'. A needle valve 41' for adjusting the flow of starch suspension through said restricted cross section passage 39' is provided in an internally threaded passage in the wall of the body 10' and has a spindle 42' projecting outwardly of the body 10' and accessible from the exterior of the body 10' for the purpose of adjusting the position of the needle valve 41' in said passage 39' so as to vary the flow of starch suspension through said restricted cross section as may be desired to vary the differential pressure across the piston and thus vary the proportions of mixing of the starch suspension and steam.

The tower 22' is provided with apertures 44' to permit passage of starch solution cooked in the chamber 25' out of the chamber 25' and into the exit passage 14'.

In the operation of the valve, when starch suspension flows through the valve due to the opening of discharge valve 19 permitting the flow of starch suspension into starch inlet 13', the starch suspension flows through the restricted cross section passage 39' and creates a differential pressure across the piston 12' and thus causes upward movement of the piston 12' in the direction to open the steam valve 18', 19' and thus allow steam to enter the mixing chamber 25' where the steam mixes with the starch suspension which enters the chamber 25' through the apertures 38' to produce cooked starch solution. With the mixing chamber 25' located within the tower 22' of the piston and with the presence of the skirt 36' on the outside of the piston, the starch suspension entering the chamber 25' from the annular space 37' defined by the skirt on the outside of the piston mixes immediately with the steam entering the mixing chamber 25' and also the presence of the skirt 36' ensures that there can be no escape, or appreciable escape, of starch suspension direct to the outlet 14' without the starch suspension mixing with the steam, thus, ensuring complete and even cooking of the starch suspension to make a lump-free starch solution.

The rate of flow of the starch suspension fluid through the apparatus can be varied by adjusting the needle valve 41' as desired. This and adjustment of the amount of steam entering the mixing chamber 25' ensures that the starch can be cooked regardless of the temperature of the starch suspension. This also ensures that the cooking of the starch can be controlled to avoid overcooking of the starch.

As shown in the drawings, a second check valve 26 may be placed in the steam inlet line to prevent any starch solution or suspension from flowing through the steam inlet line in the event there is insufficient steam pressure for the steam to flow into the starch cooking valve 2.

As shown in FIG. 3, the apparatus 1 may further comprise a second or multiple discharge means and starch cooking valves so two or more single batches of cooked starch may be dispensed simultaneously two or more commercial laundry machines.

Although the present invention has been shown and described with respect to preferred embodiments, various changes and modifications which are obvious to a person skilled in the art to which the invention pertains are deemed to lie within the spirit and scope of the invention.

What is claimed is:

1. An apparatus for cooking liquid starch solution and dispensing the cooked starch solution in single batch quantities immediately upon cooking into one or more commercial laundry machines, comprising:
   a. means for preparing a starch suspension of uncooked starch in water;
   b. discharge means for discharging the starch suspension to a starch cooking valve for cooking the uncooked starch suspension to form a starch solution;
   c. the cooking valve comprising:
      a body;
      a piston working in the body;
      a starch suspension inlet to admit the starch suspension to the body on one side of the piston;
      a steam inlet to admit steam to the body on the side of the piston remote from the starch suspension inlet;
      the piston being operatively connected to a valve member controlling the inlet of the steam into the body;
      the piston having an annular wall on the remote side defining a mixing chamber for the steam and starch suspension where the starch suspension is cooked by the steam to form a starch solution;
      the mixing chamber being within the annular wall and providing a space outside the wall between the wall and the body;
      the inlet for the steam being arranged so as to deliver the steam directly into the mixing chamber;
      means for delivering the starch suspension to the mixing chamber;
      a passage of restricted cross section leading from the one side of the piston to the remote side to permit passage therethrough of the starch suspension;
      the passage of restricted cross section being in the body wall and having valve means to control the passage of the starch suspension therethrough;
      the piston having a skirt extending from the annular wall and defining an annular space between the exterior of the annular wall and the interior of the body with which space the passage of restricted cross section communicates;
      at least one passage through the annular wall from the annular space to the mixing chamber; and
      an outlet for dispensing the starch solution communicating with the mixing chamber and one or more commercial laundry machines.

2. The apparatus of claim 1, further comprising controlling means for controlling the means for preparing a starch suspension and for controlling the discharge of starch suspension into, and the dispensing of starch solution from, the starch cooking valve so that starch solution is dispensed in single batch quantities to one or more commercial laundry machines.

3. The apparatus of claim 2, wherein the means for preparing the starch suspension comprises:
   a. a reservoir having capacity for holding that quantity of uncooked starch suspension needed to make at least one batch of starch solution, the reservoir having a top portion, sidewalls, a bottom portion, and a drain in the bottom portion;
   b. filling means for filling the reservoir with water and uncooked starch to form an uncooked starch suspension; and
   c. agitation means for agitating the uncooked starch suspension in the reservoir.

4. The apparatus of claim 3, wherein the agitation means comprises at least one mixing blade in the bottom portion of the reservoir powered by a mixing motor.

5. The apparatus of claim 3, wherein the filing means comprises:
   a. a hopper having a hopper outlet, the hopper being juxtaposed above the reservoir;
   b. a means for moving the dry starch through the hopper outlet;
   c. a spray-down platform between the reservoir and the hopper affixed to the reservoir sidewalls in the top portion of the reservoir so the dry starch falls from the hopper outlet onto the spray-down platform;
   d. a spray means for spraying water onto the spray-down platform to form a starch suspension as the starch falls from the hopper outlet onto the platform; and
   e. an opening between the spray-down platform and the reservoir for permitting the starch suspension to fall into the reservoir.

6. The apparatus of claim 5, wherein the means for moving the dry starch through the hopper outlet and into the reservoir comprises an auger powered by an auger motor.

7. The apparatus of claim 5, wherein the spray means comprises:
   a. a sprayer conduit extending along a sidewall of the spray-down platform;
   b. a water inlet conduit connected to the sprayer conduit on one end and to a water supply source on the other end; and
   c. a water inlet valve connected to the water inlet conduit selectively opening to permit water to flow through the inlet conduit and through the sprayer conduit and selectively closing to prevent water from flowing into the inlet conduit and through the sprayer conduit.

8. The apparatus of claim 7, wherein the discharge means comprises a. a pump having a pump inlet and a pump discharge;

b. a pump inlet conduit connecting the pump inlet to the drain of the reservoir;

c. a discharge conduit connecting the pump discharge to the starch suspension inlet of the starch cooking valve; and d. a discharge valve connected to the discharge conduit selectively opening to permit the starch suspension to flow from the pump to the starch suspension inlet and selectively closing to prevent the flow of starch suspension from the pump to the starch suspension inlet.

9. The apparatus of claim 3, wherein the controlling means comprises:

a. an electronic control board, including a timing device and a plurality of relays, associated with the discharge valve for measuring the length of time the discharge valve has been open and for receiving and relaying signals to and from one or more commercial laundry machines;

b. a discharge solenoid being an electrically energized solenoid connected to the discharge valve and responsive to the electronic control board for opening the discharge valve when the electronic control board receives and relays the signal from the commercial laundry machine and closing the discharge valve when the electronic control board signals that the discharge valve has been open for a first predetermined period of time;

c. the electronic control board being further associated with the water inlet valve for measuring the length of time the inlet valve has been open and for receiving and relaying signals to and from one or more commercial laundry machines; and d. a water inlet solenoid being an electrically energized solenoid connected to the water inlet valve and responsive to the electronic control board for opening the water inlet valve when the electronic control board receives and relays the signal from the commercial laundry machine and closing the water inlet valve when the electronic control board signals that the water inlet valve has been open for a second predetermined period of time.

10. The apparatus of claim 9, wherein the second predetermined period of time is calculated to permit the discharge of a single batch of starch solution and the discharge of additional clean water to clean the spray-down platform, the reservoir, the pump inlet conduit, the discharge valve, the discharge conduit, and the starch cooking valve.

11. The apparatus of claim 1, wherein the starch suspension inlet of the starch cooking valve communicates with a tube which extends centrally into the mixing chamber.

12. The apparatus of claim 11, wherein the valve member of the starch cooking valve is carried by the piston and is adapted to engage a valve seat provided on the end of the second fluid inlet tube within the mixing chamber and there being spring means acting on the valve member tending to urge the valve member into sealing engagement with the valve seat, wherein the spring means comprises a heavy compression spring assisted by a light compression spring, the compression of the latter being variable by means of an operating knob and spindle rotatably mounted in the valve body.

13. The apparatus of claim 12, wherein the valve body of the starch cooking valve is of generally cylindrical form, the starch suspension and steam inlets being formed in the base thereof, the steam inlet tube extending from the base axially within the body, the piston being of frusto-conical form and surrounding said tube to define the mixing chamber between the tube and the piston, the piston having a radial base flange in engagement with the inner surface of the body and the valve member, which controls the steam inlet being secured to the underside of the upper end of the piston, the frusto-conical wall of the piston having openings therethrough to allow the first fluid to enter the mixing chamber and the cooked starch solution to pass out of the chamber to the valve outlet.

14. The apparatus of claim 13, wherein the passage of restricted cross section of the starch cooking valve is provided with a needle valve for adjusting the rate of flow of starch suspension therethrough.

15. The apparatus of claim 11, wherein the valve body of the starch cooking valve is of generally cylindrical form, the starch suspension and steam inlets being formed in the base thereof, the steam inlet tube extending from the base axially within the body, the piston being of frusto-conical form and surrounding said tube to define the mixing chamber between the tube and the piston, the piston having a radial base flange in engagement with the inner surface of the body and the valve member, which controls the steam inlet being secured to the underside of the upper end of the piston, the frusto-conical wall of the piston having openings therethrough to allow the first fluid to enter the mixing chamber and the cooked starch solution to pass out of the chamber to the valve outlet.

16. The apparatus of claim 15, wherein the passage of restricted cross section of the starch cooking valve is provided with a needle valve for adjusting the rate of flow of starch suspension therethrough.

17. An apparatus for cooking liquid starch solution and dispensing the cooked starch solution in single batch quantities immediately upon cooking into one or more commercial laundry machines, comprising:

a. a reservoir having capacity for holding that quantity of uncooked starch suspension needed to make at least one batch of starch solution, the reservoir having a top portion, sidewalls, a bottom portion, and a drain in the bottom portion;

b. filling means for filling the reservoir with water and uncooked starch to form an uncooked starch suspension;

c. agitation means for agitating the uncooked starch suspension in the reservoir;

d. discharge means for discharging the starch suspension to a starch cooking valve for cooking the uncooked starch suspension to form a starch solution;

e. the starch cooking valve comprising a body;

a piston working in the body;

a starch suspension inlet to admit the starch suspension to the body on one side of the piston;

a steam inlet to admit steam to the body on the side of the piston remote from the starch suspension inlet;

the piston being operatively connected to a valve member controlling the inlet of the steam into the body;

the piston having an annular wall on the remote side defining a mixing chamber for the steam and starch suspension where the starch suspension is cooked by the steam to form a starch solution;

the mixing chamber being within the annular wall and providing a space outside the wall between the wall and the body;

the inlet for the steam being arranged so as to deliver the steam directly into the mixing chamber;

means for delivering the starch suspension to the mixing chamber;

a passage of restricted cross section leading from the one side of the piston to the remote side to permit passage therethrough of the starch suspension;

the passage of restricted cross section being in the body wall and having valve means to control the passage of the starch suspension therethrough;

the piston having a skirt extending from the annular wall and defining an annular space between the exterior of the annular wall and the interior of the body with which space the passage of restricted cross section communicates;

at least one passage through the annular wall from the annular space to the mixing chamber; and an outlet for dispensing the starch solution communicating with the mixing chamber and one or more commercial laundry machines;

f. the discharge means comprising a pump having a pump inlet and a pump discharge;

a pump inlet conduit connecting the pump inlet to the drain of the reservoir;

a discharge conduit connecting the pump discharge to the starch suspension inlet of the starch cooking valve; and a discharge valve connected to the discharge conduit selectively opening to permit the starch suspension to flow from the pump to the starch suspension inlet and selectively closing to prevent the flow of starch suspension from the pump to the starch suspension inlet;

g. the filing means comprising a hopper having a hopper outlet, the hopper being juxtaposed above the reservoir;

a means for moving the dry starch through the hopper outlet and into the reservoir;

a spray-down platform affixed to the reservoir sidewalls in the top portion of the reservoir so the dry starch falls from the hopper outlet onto the spray-down platform;

a sprayer conduit extending along at least one sidewall of the spray-down platform;

a water inlet conduit connected to the sprayer conduit on one end and to a water supply source on the other end;

a water inlet valve connected to the water inlet conduit selectively opening to permit water to flow through the inlet conduit and through the sprayer conduit and selectively closing to prevent water from flowing into the inlet conduit and through the sprayer conduit;

a float device affixed to the sidewall on the inside of the top portion of the reservoir below the spray-down platform;

an electrically energized solenoid connected to the water inlet valve and responsive to the float device for opening the water inlet valve when the float device signals that the water level in the reservoir has reached a first predetermined level and closing the water inlet valve when the float device signals that the water level in the reservoir has reached a second predetermined level; and an opening between the spray-down platform and the reservoir for permitting the starch suspension to fall into the reservoir; and h. cleaning means for rinsing the spray-down platform, the reservoir, the pump inlet conduit, the discharge valve, the discharge conduit, and the starch cooking valve with clean water after the discharge of starch from the reservoir and the dispensing of starch solution to a commercial laundry machine.

18. A method of cooking starch and dispensing the cooked starch solution in single batch quantities to one or more commercial laundry machines comprising:

(a) filling a reservoir with water and uncooked starch to form an uncooked starch suspension equivalent to at least one single batch of starch;

(b) agitating the starch suspension in the reservoir;

(c) discharging the starch suspension from the reservoir to a starch cooking valve for cooking the uncooked starch suspension to form a starch solution wherein the cooking valve comprises:

a body;

a piston working in the body;

a starch suspension inlet to admit the starch suspension to the body on one side of the piston;

a steam inlet to admit steam to the body on the side of the piston remote from the starch suspension inlet;

the piston being operatively connected to a valve member controlling the inlet of the steam into the body;

the piston having an annular wall on the remote side defining a mixing chamber for the steam and starch suspension where the starch is cooked by the steam to form a starch solution;

the mixing chamber being within the annular wall and providing a space outside the wall between the wall and the body;

the inlet for the steam being arranged so as to deliver the steam directly into the mixing chamber;

means for delivering the starch suspension to the mixing chamber;

a passage of restricted cross section leading from the one side of the piston to the remote side to permit passage therethrough of the starch suspension;

the passage of restricted cross section being in the body wall and having valve means to control the passage of the starch suspension therethrough;

the piston having a skirt extending from the annular wall and defining an annular space between the exterior of the annular wall and the interior of the body with which space the passage of restricted cross section communications;

at least one passage through the annular wall from the annular space to the mixing chamber; and an outlet for dispensing the starch solution communicating with the mixing chamber and one or more commercial laundry machines;

(d) dispensing the starch solution from the starch cooking valve as it is cooked in single batch quantities to one or more commercial laundry machines.

19. The method of claim 18, further comprising cleaning the starch from the reservoir and the starch cooking valve by passing clean water through the reservoir and the starch cooking valve as the starch solution is dispensed so as to flush the residual starch into the commercial laundry machine.

* * * * *